United States Patent
Manabe et al.

(10) Patent No.: US 9,298,306 B2
(45) Date of Patent: Mar. 29, 2016

(54) CONTROL APPARATUS AND COMPUTER PROGRAM PRODUCT FOR PROCESSING TOUCHPAD SIGNALS

(71) Applicant: DENSO CORPORATION, Kariya, Aichi-pref. (JP)

(72) Inventors: Makoto Manabe, Chiryu (JP); Toru Nada, Inazawa (JP); Kiyotaka Taguchi, Kariya (JP); Shinji Hatanaka, Okazaki (JP); Norio Sanma, Okazaki (JP); Akira Yoshizawa, Koganei (JP); Makoto Obayashi, Kashiwa (JP)

(73) Assignee: DENSO CORPORATION, Kariya (JP)

( * ) Notice: Subject to any disclaimer, the term of this patent is extended or adjusted under 35 U.S.C. 154(b) by 311 days.

(21) Appl. No.: 13/859,077

(22) Filed: Apr. 9, 2013

(65) Prior Publication Data

US 2013/0285949 A1    Oct. 31, 2013

(30) Foreign Application Priority Data

Apr. 12, 2012    (JP) .................................. 2012-091427

(51) Int. Cl.
*G06F 3/041*    (2006.01)
*B60K 37/06*    (2006.01)
(Continued)

(52) U.S. Cl.
CPC .............. *G06F 3/0416* (2013.01); *B60K 37/06* (2013.01); *G01C 21/367* (2013.01);
(Continued)

(58) Field of Classification Search
CPC ............. B60K 37/06; B60K 2350/928; B60K 2350/1028–2350/1032; G06F 2203/04808; G06F 1/1643; G06F 3/03547; G06F 3/04845; G06F 3/04815; G06F 3/04883
See application file for complete search history.

(56) References Cited

U.S. PATENT DOCUMENTS 8,773,394 B2 *    7/2014  Suzuki .......................... 345/174
8,839,136 B2 *    9/2014  Yoo et al. ...................... 715/773
(Continued)

FOREIGN PATENT DOCUMENTS

JP    2005-173680 A    6/2005
JP    2009-132248 A    6/2009
(Continued)

OTHER PUBLICATIONS

Kaon Koyama, "How to Display Icon of Application Fully on Display Screen", Mac Fan Mac OS X Lion Masterbook, Japan, Mainichi Communication Inc., Aug. 29, 2011, 1st Ver., pp. 64-65 (with partial English translation).

(Continued)

*Primary Examiner* — Quan-Zhen Wang
*Assistant Examiner* — Xuemei Zheng
(74) *Attorney, Agent, or Firm* — Posz Law Group, PLC (57)    ABSTRACT

A control apparatus includes a first input unit, a second input unit, and an operation command output unit. The first input unit receives a first manipulation signal indicative of a first manipulation including a first manipulation point and a first manipulation pressure from a first touchpad. The second input unit receives a second manipulation signal indicative of a second manipulation including a second manipulation point and a second manipulation pressure from a second touchpad. The operation command output unit receives the first manipulation signal and the second manipulation signal, and outputs an operation command to a display device based on a combination of the first manipulation and the second manipulation. The first touchpad is arranged to be approachable by a first manipulation finger of a left hand. The second touchpad is arranged to be approachable by a second manipulation finger of a right hand.

17 Claims, 8 Drawing Sheets

(51) Int. Cl.
*G06F 3/0488* (2013.01)
*G01C 21/36* (2006.01)
*G06F 3/0354* (2013.01)

(52) U.S. Cl.
CPC ....... *G01C 21/3664* (2013.01); *G06F 3/04883* (2013.01); *B60K 2350/1028* (2013.01); *B60K 2350/928* (2013.01); *G06F 3/03547* (2013.01); *G06F 2203/04808* (2013.01)

(56) References Cited

U.S. PATENT DOCUMENTS

| | | | |
|---|---|---|---|
| 2010/0164886 A1 | 7/2010 | Nakamura | |
| 2010/0277420 A1* | 11/2010 | Charlier et al. | 345/173 |
| 2011/0030502 A1* | 2/2011 | Lathrop | 74/552 |
| 2011/0043468 A1* | 2/2011 | Lathrop et al. | 345/173 |
| 2011/0131515 A1* | 6/2011 | Ono et al. | 715/764 |
| 2011/0169750 A1* | 7/2011 | Pivonka et al. | 345/173 |
| 2012/0126965 A1 | 5/2012 | Sanma et al. | |
| 2012/0249473 A1* | 10/2012 | Suzuki | 345/174 |
| 2012/0262386 A1* | 10/2012 | Kwon et al. | 345/173 |

FOREIGN PATENT DOCUMENTS

| | | |
|---|---|---|
| JP | 2009-298285 A | 12/2009 |
| JP | 2011-040008 A | 2/2011 |
| JP | 2012-068963 A | 4/2012 |
| JP | 2012247838 A * | 12/2012 |

OTHER PUBLICATIONS

Office Action mailed Oct. 13, 2015 in the corresponding JP application No. 2012-091427 (with English translation).

* cited by examiner

| | MANIPULATION ON TOUCHPAD | OPERATION OF SCREEN |
|---|---|---|
| 1 |  |  |
| 2 |  |  |
| 3 |  | <br>SWITCH |
| 4 |  | <br>ROTATE (2D) |

FIG. 6

| | MANIPULATION ON TOUCHPAD | OPERATION OF SCREEN |
|---|---|---|
| 5 | PUSH / PULL | ROTATE (3D) |
| 6 | (rotate finger / arrows) | +/-/M/◄/► |
| 7 | SEPARATE FINGER (upward) | SWITCH (↓) |
| 8 | (downward) SEPARATE FINGER | SWITCH (↑) |
| 9 | ALTERNATE | MAP SCROLL → |

FIG. 7

| | MANIPULATION ON TOUCHPAD | OPERATION OF SCREEN |
|---|---|---|
| 10 |  SIMULTANEOUS |  HIGH-SPEED MAP SCROLL |
| 11 |  CONTACT |  SWITCH |
| 12 |  CONTACT |  SWITCH |
| 13 |  PRESS |  SWITCH |

CONTROL APPARATUS AND COMPUTER PROGRAM PRODUCT FOR PROCESSING TOUCHPAD SIGNALS

CROSS REFERENCE TO RELATED APPLICATION

This application is based on Japanese Patent Application No. 2012-091427 filed on Apr. 12, 2012, the disclosure of which is incorporated herein by reference.

TECHNICAL FIELD

The present disclosure relates to a control apparatus that processes signals output from touchpads equipped to a steering wheel of a vehicle and a program product for processing signals output from touchpads equipped to a steering wheel of a vehicle.

BACKGROUND

Recently, touchpads that receive variety operation commands are well used. The touchpads detect an operation position on an operation panel when the operation panel is touched or pressed by a user. Some touchpads may further detect an operation pressure. The touchpads operate in one of several ways, including detecting a capacitance change, detecting a resistance change, detecting a deformation of a supportive portion of the operation panel and the like.

As disclosed in JP 2009-298285 A, the touchpad is equipped to a steering wheel of a vehicle so that a driver of the vehicle operates the touchpad in a driving state. In the driving state, the driver holds the steering wheel with hands.

When the driver operates the steering wheel, the driver may unintentionally touch the touchpad and a function corresponding to the touch on the touchpad may be activated. Compared with a device that activates a function when a predetermined operation pressure is applied to, such as a button switch, the touchpad activates the function corresponding to the touch on the operation panel more easily. Further, the functions to be activated by a touch on the operation panel include normal functions that do not substantially affect the driving of the vehicle and specific functions that may substantially affect the driving of the vehicle. For example, the normal functions may include changing a temperature of an air conditioning, changing a volume of audio device and the like. The specific functions may include turning on/off the audio device, canceling of a route guidance and the like. The normal functions do not substantially affect the driving of the vehicle when the normal functions are activated for one time by the unintentional operation of the user. However, the specific functions may substantially affect the driving of the vehicle when activated one time. Thus, it is necessary to reduce the unintentional activation of the specific functions that may substantially affect the driving of the vehicle.

SUMMARY

In view of the foregoing difficulties, it is an object of the present disclosure to provide a control apparatus, which reduces an unintentional activation of a specific function, and a program product for reducing the unintentional activation of the specific function.

According to an aspect of the present disclosure, a control apparatus includes a first input unit, a second input unit, and an operation command output unit. The first input unit receives a first manipulation signal from a first touchpad. The first manipulation signal is indicative of a first manipulation performed on the first touchpad. The second input unit receives a second manipulation signal from a second touchpad. The second manipulation signal is indicative of a second manipulation performed on the second touchpad. The operation command output unit receives the first manipulation signal from the first input unit and receives the second manipulation signal from the second input unit, and outputs an operation command to a display device based on a combination of the first manipulation performed on the first touchpad and the second manipulation performed on the second touchpad. The first touchpad is arranged at a first position that is approachable by a user with a first manipulation finger of a left hand. The first touchpad detects the first manipulation including a first manipulation point and a first manipulation pressure on a surface of the first touchpad. The second touchpad is arranged at a second position that is approachable by the user with a second manipulation finger of a right hand. The second touchpad detects the second manipulation including a second manipulation point and a second manipulation pressure on a surface of the second touchpad.

With the above apparatus, an unintentional activation of a specific function that may substantially affect a driving of the vehicle is reduced.

According to another aspect of the present disclosure, a program product, which is stored in a non-transitory computer-readable medium for processing signals output from a first touchpad and a second touchpad, includes instructions for inputting a first manipulation signal, which is transmitted from the first touchpad and is indicative of a first manipulation performed on the first touchpad, inputting a second manipulation signal, which is transmitted from the second touchpad and is indicative of a second manipulation performed on the second touchpad, and outputting an operation command to a display device based on a combination of the first manipulation performed on the first touchpad and the second manipulation performed on the second touchpad. The first touchpad is arranged at a first position that is approachable by a user with a first manipulation finger of a left hand. The first touchpad detects the first manipulation including a first manipulation point and a first manipulation pressure on a surface of the first touchpad. The second touchpad is arranged at a second position that is approachable by the user with a second manipulation finger of a right hand. The second touchpad detects the second manipulation including a second manipulation point and a second manipulation pressure on a surface of the second touchpad.

With the above program product, an unintentional activation of a specific function that may substantially affect a driving of the vehicle is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments of the present disclosure with reference to the drawings.

First Embodiment

Figure 1:
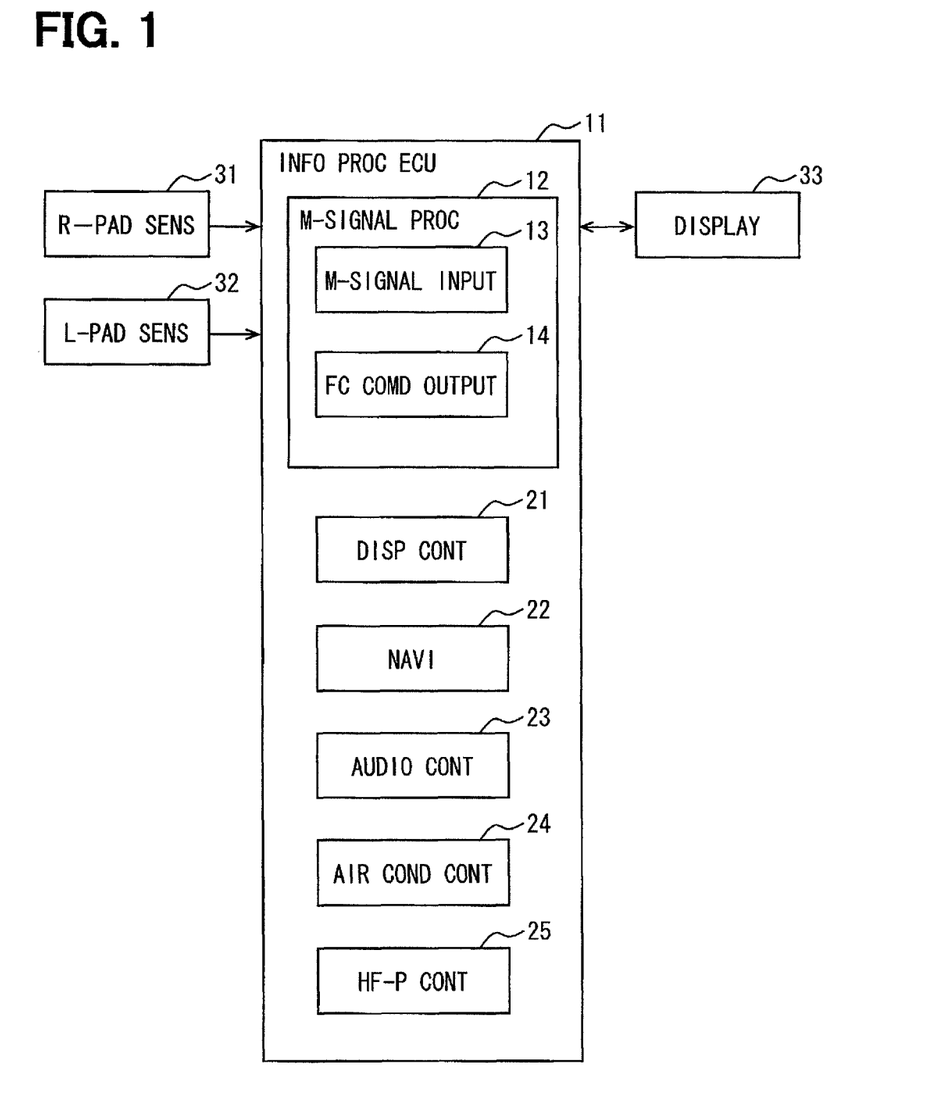
FIG. 1 is a block diagram showing configuration of a control apparatus according to an embodiment of the present disclosure.

As shown in FIG. 1, an information processing electronic control unit (INFO PROC ECU) 11 is coupled with a right pad sensor (R-PAD SENS) 31, a left pad sensor (L-PAD SENS) 32, and a display device (DISPLAY) 33.

The information process ECU 11 includes a manipulation signal processing unit (M-SIGNAL PROC) 12, a display control unit (DISP CONT) 21, a navigation unit (NAVI) 22, an audio control unit (AUDIO CONT) 23, an air conditioning control unit (AIR COND CONT) 24, and a handsfree phone control unit (HF-P CONT) 25. The manipulation signal processing unit 12 functions as the control apparatus according to the present embodiment.

The manipulation signal processing unit 12 controls the display device 33 to display a menu on a display screen (not shown). Further, the manipulation signal processing unit 12 outputs commands to the navigation unit 22, the audio control unit 23, the air conditioning control unit 24, and the handsfree phone control unit 25 based on manipulations performed to the right pad sensor 31 and the left pad sensor 32. The manipulation signal processing unit 12 will be described in detail later.

The display control unit 21 generates a display image to be displayed on the display screen of the display device 33 based on commands transmitted from the manipulation signal processing unit 12, the navigation unit 22, the audio control unit 23, the air conditioning control unit 24 and the handsfree phone control unit 25. Further, the display control unit 21 outputs an image signal corresponding to the generated display image to the display device 33.

The navigation unit 22 controls the display device 33 to display a map of an area around a current position of a vehicle and a guidance route on the display screen. The navigation unit 22 further outputs an audio guidance via an audio device (not shown).

The audio control unit 23 controls the audio device (not shown). Specifically, the audio control unit 23 outputs commands to the audio device to switch an input source of the audio device, to change a volume of the audio device, and to change an audio track and the like.

The air conditioning control unit 24 controls an air conditioning (not shown). Specifically, the air conditioning control unit 24 outputs commands to the air conditioning, to turn on and turn off the air conditioning, to set a temperature, to set an air volume, and to select an air outlet and the like. The handsfree phone control unit 25 controls a phone (not shown). Specifically, the handsfree phone control unit 25 outputs commands to the phone to send and receive a call, to change a volume of a call and the like.

The manipulation signal processing unit 12 includes a central processing unit (CPU), a dynamic random access memory (DRAM), a flash memory, an input/output interface, which are not shown. The manipulation signal processing unit 12 includes a manipulation signal input sub-unit (M-SIGNAL INPUT) 13 and a function command output sub-unit (FC COMD OUTPUT) 14 as functional blocks. Specifically, the CPU of the manipulation signal processing unit 12 executes a program, which is read out from the flash memory to the DRAM, so that the manipulation signal processing unit 12 functions as the manipulation signal input sub-unit 13 and the function command output sub-unit 14.

The manipulation signal input sub-unit 13 receives manipulation signals from the right pad sensor 31 and the left pad sensor 32. The function command output sub-unit 14 outputs commands to the navigation unit 22, the audio control unit 23, the air conditioning control unit 24, and the handsfree phone control unit 25 based on the manipulation signals received by the manipulation signal input sub-unit 13.

Figure 2:
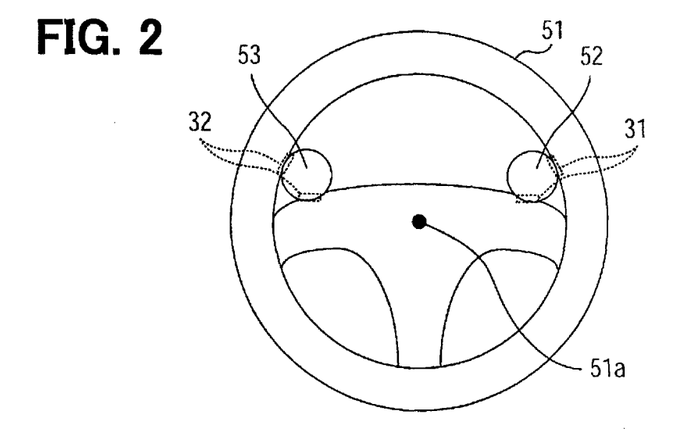
FIG. 2 is a diagram showing a front view of a steering wheel of a vehicle.

FIG. 2 shows a steering wheel from a view of the driver. As shown in FIG. 2, the right pad sensor 31 is equipped to a right touchpad 52. The right touchpad 52 is arranged at a manipulatable position by the driver with the right thumb when the driver holds the steering wheel 51 with the right hand. The right pad sensor 31 detects a manipulation performed by the driver to the right touchpad 52. Specifically, the right pad sensor 31 detects a manipulation position and a manipulation pressure on the right touchpad 52 and outputs corresponding manipulation signals to the information process ECU 11. The right pad sensor 31 may be provided by a strain gauge. The right pad sensor 31 may be provided by a sensor that is capable of detecting a manipulation position and a manipulation pressure other than the strain gauge. Further, the right pad sensor 31 may be provided by plural sub-sensors. The manipulation signals output from the right pad sensor 31 may be analog signals or digital signals. Hereinafter, the signal described in the present disclosure may be an analog signal or a digital signal.

As shown in FIG. 2, the left pad sensor 32 is equipped to a left touchpad 53. The left touchpad 53 is arranged at a manipulatable position by the driver with the left thumb when the driver holds the steering wheel 51 with the left hand. The left pad sensor 32 detects a manipulation performed by the driver to the left touchpad 53. Specifically, the left pad sensor 32 detects a manipulation position and a manipulation pressure on the left touchpad 53 and outputs corresponding manipulation signals to the information process ECU 11. The left pad sensor 32 may be provided by a strain gauge. The left pad sensor 32 may be provided by a sensor that is capable of detecting a manipulation position and a manipulation pressure other than the strain gauge. Further, the left pad sensor 32 may be provided by plural sub-sensors.

Further, the steering wheel 51 is arranged approximately parallel to a vertical plane to which the driver faces. Further, a rotational center 51a of the steering wheel 51 is placed on a front direction in the view of the driver. That is, a plane on which the right touchpad 52 and the left touchpad 53 are placed is approximately parallel to the vertical plane to which the driver faces.

The display device 33 in FIG. 1 may be provided by a liquid crystal display, an organic light-emitting diode (OLED) display and the like. The display device 33 displays variety images based on image signals transmitted from the display control unit 21 on the display screen.

The following will describe an operation of the manipulation signal processing unit 12. Specifically, the operation is executed by the CPU of the manipulation signal processing unit 12. As described above, the CPU of the manipulation signal processing unit 12 executes the program, which is read out from the flash memory to the DRAM.

Figure 3:
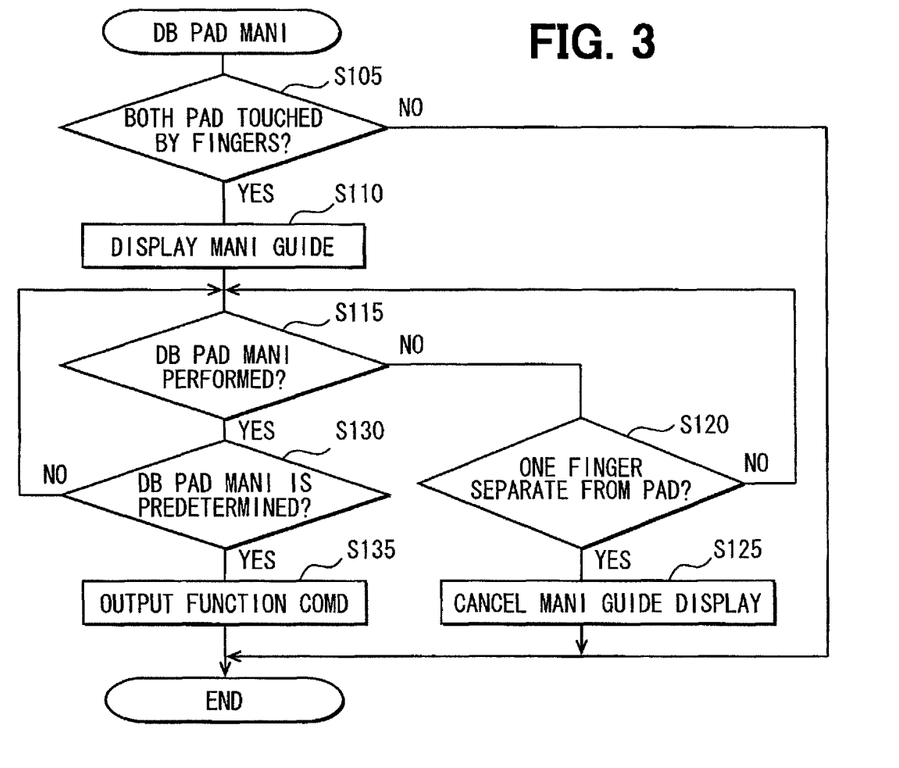
FIG. 3 is a flowchart showing a process executed when a double pad manipulation is performed.

The following will describe a process executed when a double pad manipulation (DB PAD MANI) is performed with reference to FIG. 3. The double pad manipulation refers to a manipulation on both the right touchpad 52 and the left touchpad 53. Hereinafter, the process executed when the double pad manipulation is performed is also referred to as a double pad manipulation process. The double pad manipulation process starts when an ignition switch or an accessory switch is turned on.

When double pad manipulation process starts, at S105, the manipulation signal processing unit 12 determines whether both the right touchpad 52 and the left touchpad 53 are respectively touched by a first manipulation finger and a second manipulation finger of the driver based on the manipulation signals output from the right pad sensor 31 and the left pad sensor 32. In the present disclosure, the thumb is also referred to as a finger. Herein, the first manipulation finger is one of the fingers of the driver that manipulates the right touchpad 52, and the second manipulation finger is one of the fingers of the driver that manipulates the left touchpad 53. Further, the right touchpad 52 and the left touchpad 53 are also referred to as touchpads 52, 53. When the manipulation signal processing unit 12 determines that both the right touchpad 52 and the left touchpad 53 are touched by the first manipulation finger and the second manipulation finger (S105: YES), the process proceeds to S110. When the manipulation signal processing unit 12 determines that not both the right touchpad 52 and the left touchpad 53 are touched by the first manipulation finger and the second manipulation finger (S105: NO), the process stands by at S105.

Figure 4A:
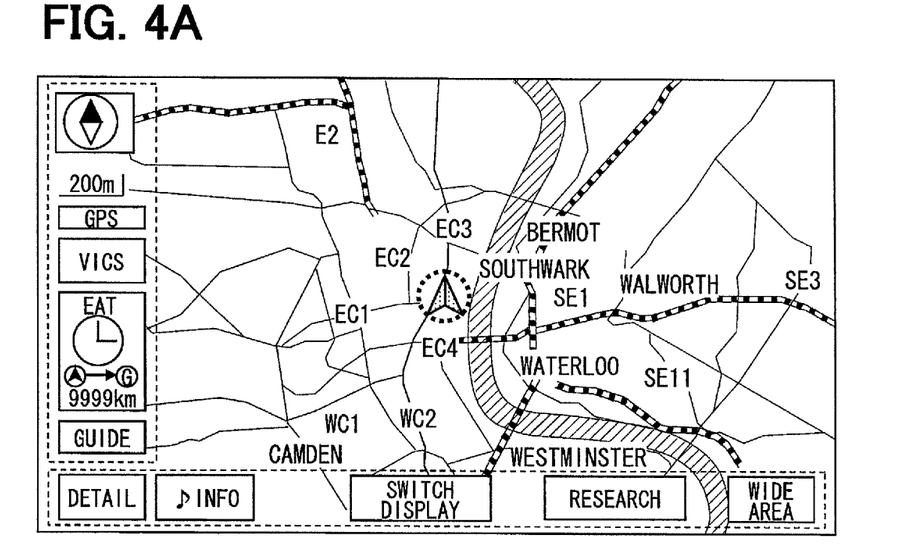
FIG. 4A and FIG. 4B are diagrams showing a route guidance corresponding to a double pad manipulation.
Figure 4B:
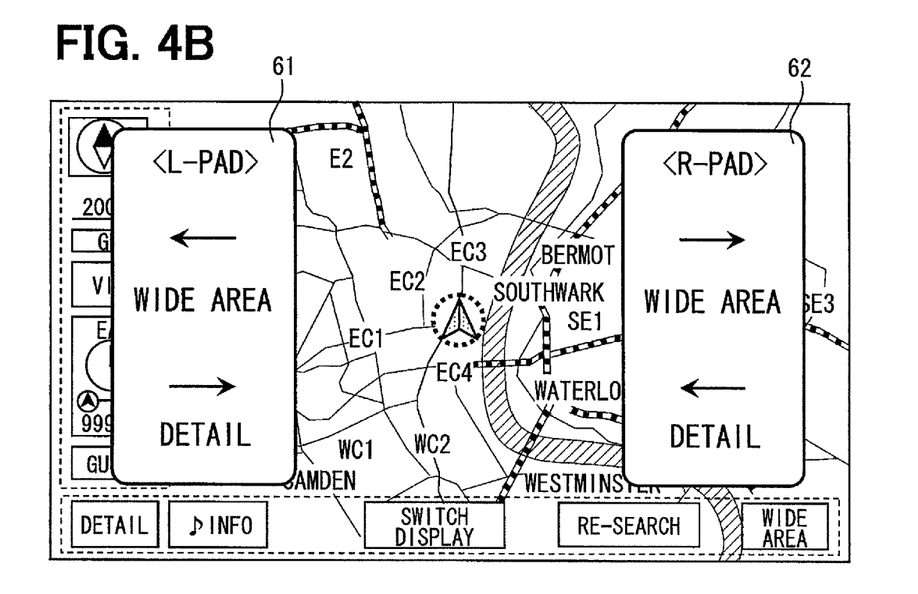

At S110, the manipulation signal processing unit 12 transmits a manipulation guide display command to the display control unit 21 so that the display control unit 21 controls the display device 33 to display a manipulation guide image of the right touchpad 52 and the left touchpad 53 on the display screen. The following will describe an example of the manipulation guide image with reference to FIG. 4A and FIG. 4B. Hereinafter, the display screen of the display device 33 is referred to as the screen for the convenience of description. FIG. 4A is an example of a display image displayed on the display screen before the manipulation guide image is displayed on the display screen. FIG. 4A is a map image of an area. FIG. 4B is an example of the manipulation guide image. The manipulation guide image includes a first sub-image 61 and a second sub-image 62. The first sub-image 61 displays a manipulation guide related to the left touchpad 53. The second sub-image 62 displays a manipulation guide related to the right touchpad 52. That is, when the driver moves the second manipulation finger in a left direction on the left touchpad 53 and moves the first manipulation finger in a right direction on the right touchpad 52 at the same time (synchronously), a map scale of the map image shown in FIG. 4A is decreased and a map image of a wide area, which is broader than a previously displayed area, is displayed on the display screen (zoom out). Herein, the left direction and the right direction are defined in the view of the driver. Further, when the driver moves the second manipulation finger in the right direction on the left touchpad 53 and moves the first manipulation finger in the left direction on the right touchpad 52 at the same time, the map scale of the map image shown in FIG. 4A is increased and a map image of a narrower area is displayed on the display screen (zoom in). At the same time, details of the narrower area are displayed on the display screen.

As described above, the manipulation guide image is displayed on the display screen by overlapping the map image previously displayed on the display screen. Thus, the driver is informed of display operations of the display screen 33 corresponding to the manipulations before performing a manipulation on both the right touchpad 52 and the left touchpad 53.

At S115, the manipulation signal processing unit 12 determines whether both the right touchpad 52 and the left touchpad 53 are manipulated by the driver at the same time. When the manipulation signal processing unit 12 determines that both the right touchpad 52 and the left touchpad 53 are manipulated by the driver at the same time (S115: YES), the process proceeds to S130. When the manipulation signal processing unit 12 determines that the right touchpad 52 and the left touchpad 53 are not manipulated by the driver at the same time (S115: NO), the process proceeds to S120.

At S120, the manipulation signal processing unit 12 determines whether the first manipulation finger separates from the right touchpad 52 or the second manipulation finger separates from the left touchpad 53 based on the manipulation signals from the right pad sensor 31 and the left pad sensor 32. When the manipulation signal processing unit 12 determines that one of the first manipulation finger and the second manipulation finger separates from a corresponding touchpad 52, 53 (S120: YES), the process proceeds to S125. When the manipulation signal processing unit 12 determines that neither the first manipulation finger nor the second manipulation finger separates from the corresponding touchpad 52, 53 (S120: NO), the process returns to S115. Further, when each of the first manipulation finger and the second manipulation finger separates from the corresponding touchpads 52, 53 for a short time period, such as equal to or less than one second, the manipulation signal processing unit 12 determines that each of the first manipulation finger and the second manipulation finger stays on the corresponding touchpad 52, 53.

At S125, the manipulation signal processing unit 12 transmits a manipulation guide cancel command to the display control unit 21 so that the display control unit 21 controls the manipulation guide image to disappear from the display screen. Then, the process ends.

At S130, the manipulation signal processing unit 12 determines whether manipulation performed at the same time on the right touchpad 52 and the left touchpad 53 is a predetermined manipulation. Information of predetermined manipulations may be stored in the flash memory (not shown). Examples of the predetermined manipulations will be described later in detail. When the manipulation signal processing unit 12 determines that manipulation performed at the same time on the right touchpad 52 and the left touchpad 53 is a predetermined manipulation (S130: YES), the process proceeds to S135. When the manipulation signal processing unit 12 determines whether manipulation performed at the same time on the right touchpad 52 and the left touchpad 53 is not a predetermined manipulation (S130: NO), the process returns to S115.

At S135, the manipulation signal processing unit 12 transmits a command corresponding to the manipulation performed at the same time on the right touchpad 52 and the left touchpad 53 to a corresponding device. The functions corresponding to the manipulations performed at the same time on the right touchpad 52 and the left touchpad 53 will be described later in detail. Then, the process ends.

The manipulation signal processing unit 12 may execute well-known processes other than the double pad manipulation process described above.

For example, the well-known processes may include a single pad manipulation process in which the manipulation signal processing unit 12 transmits a function command to a corresponding device when one of the touchpads 52, 53 is manipulated by a finger of the driver. In this case, the function activated by single pad manipulation is limited to one of the normal functions that do not substantially affect the driving of the vehicle. For example, the normal functions may include changing a temperature of an air conditioning, changing a volume of an audio device and the like. The normal functions do not substantially affect the driving of the vehicle when the normal functions are activated for one time.

The following will describe the functions corresponding to the manipulations performed at the same time on both the right touchpad 52 and the left touchpad 53 with reference to FIG. 5 to FIG. 9. In the following examples, two or more different functions may correspond to the same manipulation on both the right touchpad 52 and the left touchpad 53. Further, in actual use or implementation, one manipulation may correspond to only one function.

(1) Increase Map Scale

Figure 5:
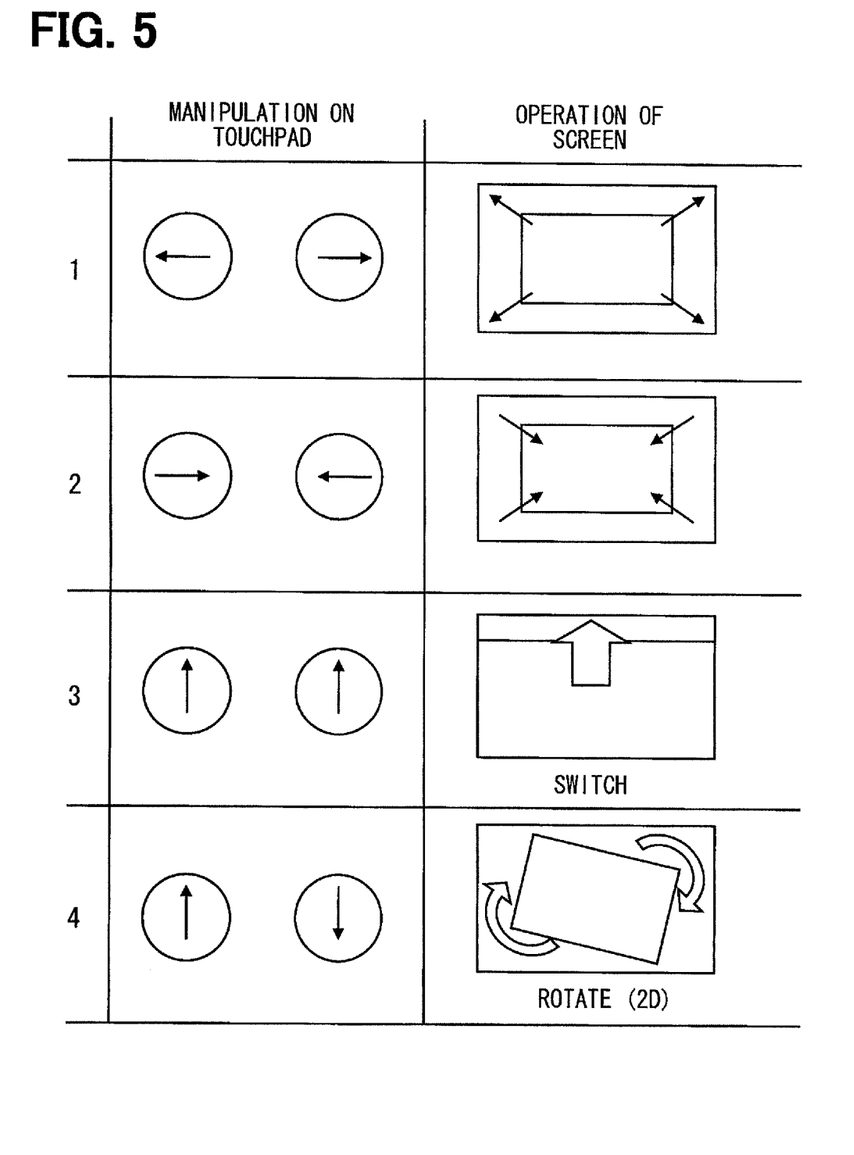
FIG. 5 is a diagram showing double pad manipulations and corresponding operations of a display device.

As shown in FIG. 5, when the second manipulation finger moves in the left direction on the left touchpad 53 and the first manipulation finger moves in the right direction on the right touchpad 52 at the same time, a map scale of a map image displayed on the display screen decreases and a map image of a wide area, which is broader than a previously displayed area, is displayed on the display screen (zoom out).

(2) Decrease Map Scale

As shown in FIG. 5, when the second manipulation finger moves in the right direction on the left touchpad 53 and the first manipulation finger moves in the left direction on the right touchpad 52 at the same time, the map scale of the map image displayed on the display screen increases and a map image of an area, which is narrower than the previously displayed area, is displayed on the display screen (zoom in). At the same, details of the area are displayed on the display screen.

(3) Display Other Application Software 1

As shown in FIG. 5, when the second manipulation finger moves in an upward direction on the left touchpad 53 and the first manipulation finger moves in the upward direction on the right touchpad 52 at the same time, a setting window of an activated application software is displayed on the display screen. Herein, the activated application software is a currently displayed application software on the display screen. In this case, suppose that the application software has the setting window. Herein, the upward direction is defined in the view of the driver. When displaying the setting window of the application software, a previous display window of the application software may scroll in the upward direction and disappears from the display screen. At the same time, the setting window of the application software may be displayed on the display screen in a step-by-step manner. Further, the previous display window of the application software may scroll in the upward direction and disappears from the display screen, and at the same time, the setting window of the application software may scroll in the display screen and is displayed on the display screen of the display device 33.

Further, when the second manipulation finger moves in a downward direction on the left touchpad 53 and the first manipulation finger moves in the downward direction on the right touchpad 52 at the same time, the setting window of the activated application software may be displayed on the display screen. Herein, the activated application software is a currently displayed application software on the display screen. In this case, suppose that the application software has the setting window. Herein, the downward direction is defined in the view of the driver.

Further, when the second manipulation finger moves in the right direction on the left touchpad 53 and the first manipulation finger moves in the right direction on the right touchpad 52 at the same time, the setting window of the activated application software may be displayed. Herein, the activated application software is the currently displayed application software on the display screen. In this case, suppose that the application software has the setting window.

Further, when the second manipulation finger moves in the left direction on the left touchpad 53 and the first manipulation finger moves in the left direction on the right touchpad 52 at the same time, the setting window of the activated application software is displayed. Herein, the activated application software is the currently displayed application software on the display screen. In this case, suppose that the application software has the setting window.

As described, when the first and the second manipulation finger move in the same direction on respective touchpads 52, 53, the setting window of the activated application software is displayed. Further, a display window of a different application software may be displayed other than the setting window of the activated application software.

(4) Image Rotation in Two-Dimensional (2D) Manner

As shown in FIG. 5, when the second manipulation finger moves in the upward direction on the left touchpad 53 and the first manipulation finger moves in the downward direction on the right touchpad 52 at the same time, a current display window that is currently displayed on the display screen rotates in a clockwise direction. Herein, rotating in the clockwise direction is also referred to as rotating in the right direction.

Further, as shown in FIG. 5, when the second manipulation finger moves in the downward direction on the left touchpad 53 and the first manipulation finger moves in the upward direction on the right touchpad 52 at the same time, the current display window on the display screen rotates in a counterclockwise direction. Herein, rotating in the counterclockwise direction is also referred to as rotating in the left direction.

Further, a rotation angle may correspond to a manipulation amount.

(5) Image Rotation in Three-Dimensional (3D) Manner

Figure 6:
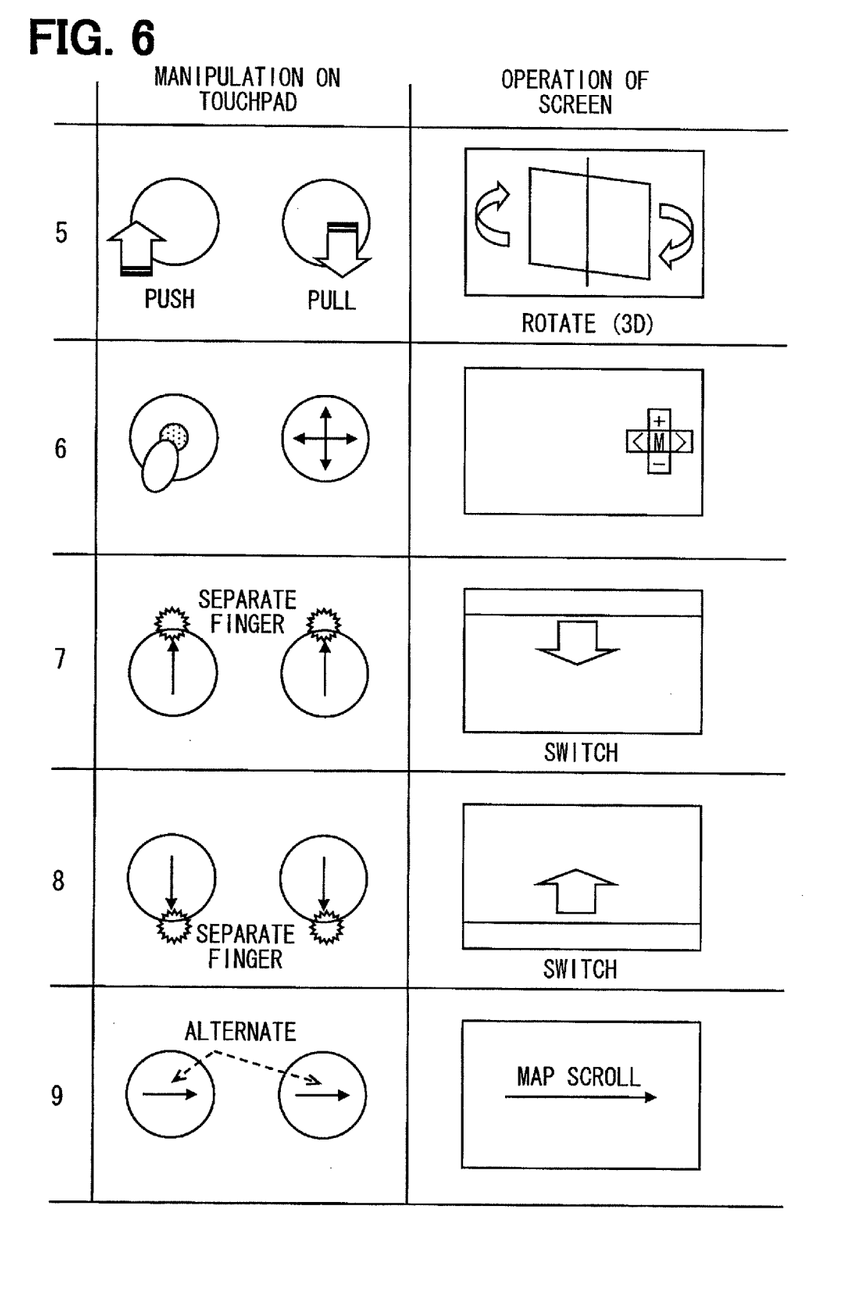
FIG. 6 is a diagram showing double pad manipulations and corresponding operations of a display device.

As shown in FIG. 6, when a front surface of the left touchpad 53 is pressed by the second manipulation finger and a rear surface of the right touchpad 52 is pressed by the first manipulation finger at the same time, the current display window on the display screen rotates (reverses) 180 degrees around a center line of the display screen, which extends in an up-down direction of the display screen, as a rotation axis in a three-dimensional manner. Hereinafter, the center line extends in the up-down direction of the display screen is also referred to as an up-down center line. Then, a different display window is displayed on the display screen. Herein, the front surface of each touchpad 52, 53 refers to a surface that faces toward a rear direction of the vehicle, and the rear surface of each touch pad 52, 53 refers to a surface that faces towards a front direction of the vehicle. That is, the front surface of each touchpad 52, 53 faces the driver. Further, when the current display window on the display screen rotates around the rotation axis, a left portion of the current display window moves in an outward direction with respect to the display screen and a right portion of the current display window moves in an inward direction with respect to the display screen. Herein, the left portion and the right portion of the display window is defined with respect to the up-down center line of the display screen 33, which extends in the up-down direction of the display screen.

Further, when the rear surface of the left touchpad 53 is pressed by the second manipulation finger and the front surface of the right touchpad 52 is pressed by the first manipulation finger at the same time, the current display window on the display screen rotates (reverses) 180 degrees around the rotation axis in a three-dimensional manner. Then, a different display window is displayed on the display screen. Further, when the current display window on the display screen rotates around the up-down center line of the display screen, the left portion of the current display window moves in the rear direction of the vehicle and the right portion of the current display window moves in the rear direction of the vehicle.

(6) Manipulation in Display Window

As shown in FIG. 6, when the first manipulation finger presses or moves on the right touchpad 52 under a condition that the second manipulation finger stays on the left touchpad 53, an icon included in the display window is operated corresponding to the manipulation performed on the touchpads 52, 53. As an example of the operation of the icon, a cursor may move corresponding to the manipulation performed on the touchpads 52, 53. Further, a function linked to the icon may be executed corresponding to the manipulation performed on the touchpads 52, 53. Further, when the second manipulation finger presses or moves on the left touchpad 53 under a condition that the first manipulation finger stays on the right touchpad 52, an icon included in the display window may be operated corresponding to the manipulation performed on the touchpads 52, 53.

(7) Confirm Another Display Window 1

As shown in FIG. 6, when the first manipulation finger moves in the upward direction on the right touchpad 52 and the second manipulation finger moves in the upward direction on the left touchpad 53 at the same time, correlative with the manipulation on the touchpads 52, 53, the current display window on the display screen scrolls in the upward direction to disappear and a new display window is displayed on the display screen. Hereinafter, the display window scrolled in the upward direction is referred to as a previous display window, and the new display window displayed after the previous display window is referred to as a subsequent display window. Further, when the first manipulation finger separates from the right touchpad 52 after the first manipulation finger reaches a top edge of the right touchpad 52 and the second manipulation finger separates from the left touchpad 53 after the second manipulation finger reaches a top edge of the left touchpad 53, the previous display window scrolls in the downward direction and the subsequent display window disappears from the display screen. When the previous display window scrolls in the downward direction, the previous display window may appear like that the previous display window falls with the force of gravity.

(8) Confirm Another Display Window 2

Further, when the first manipulation finger moves in the downward direction on the right touchpad 52 and the second manipulation finger moves in the downward direction on the left touchpad 53 at the same time, in conjunction with the manipulation on the touchpads 52, 53, the current display window on the display screen scrolls in the downward direction and a new display window is displayed on the display screen Hereinafter, the display window scrolled in the downward direction is referred to as a previous display window, and the new display window displayed after the previous display window is referred to as a subsequent display window. Further, as shown in FIG. 6, when the first manipulation finger separates from the right touchpad 52 after the first manipulation finger reaches a bottom edge of the right touchpad 52 and the second manipulation finger separates from the left touchpad 53 after the second manipulation finger reaches a bottom edge of the left touchpad 53, the previous display window scrolls in the downward direction and the subsequent display window disappears from the display screen.

(9) Map Scroll

As shown in FIG. 6, when the second manipulation finger and the first manipulation finger move alternately on the corresponding touchpad 52, 53 in the same direction, a map displayed on the display screen scrolls in the same direction with the manipulation direction of the second manipulation finger and the first manipulation finger on the touchpads 52, 53.

(10) High Speed Map Scroll

Figure 7:
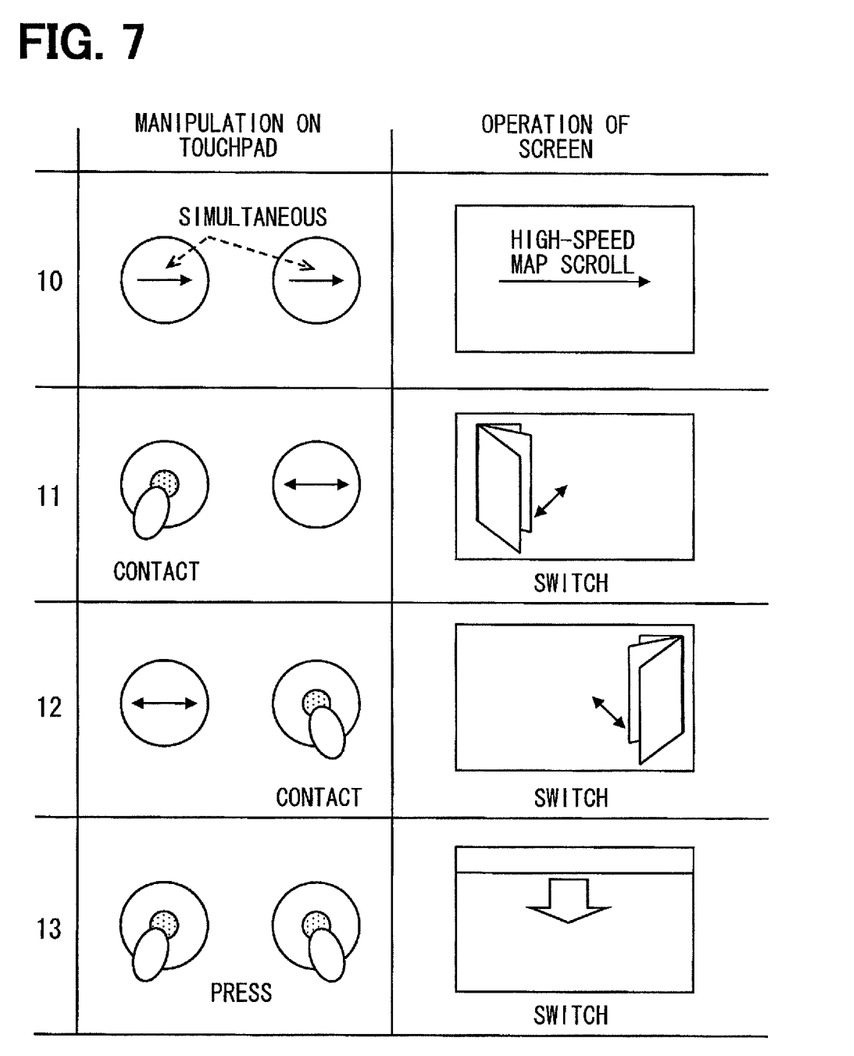
FIG. 7 is a diagram showing double pad manipulations and corresponding operations of a display device.

As shown in FIG. 7, when the second manipulation finger and the first manipulation finger moves approximately at the same time (simultaneously) on the corresponding touchpad 52, 53 in the same direction, a map displayed on the display screen scrolls in the same direction at a high speed with the manipulation direction of the second manipulation finger and the first manipulation finger on the touchpads 52, 53. In this case, a scroll speed of the map is higher than a speed in a case where the second manipulation finger and first manipulation finger move alternately on the corresponding touchpad 52, 53 in the same direction.

(11) Switch to Another Window of the Same Application Software 1

As shown in FIG. 7, when the first manipulation finger moves in the right direction or in the left direction on the right touchpad 52 under a condition that the second manipulation finger stays on the left touchpad 53, a display window of an activated application software is switched to a different display window of the activated application software corresponding to a moving direction of the first manipulation finger on the right touchpad 52. In this case, suppose that the activated application software has two or more display windows. For example, when the first manipulation finger moves in the left direction on the right touchpad 52 under a condition that the second manipulation finger stays on the left touchpad 53, the two or more display windows of the application software may turn from the right to the left like turning pages of a book, which is bound on the left side.

(12) Switch to Another Window of the Same Application Software 2

As shown in FIG. 7, when the second manipulation finger moves in the right direction or in the left direction on the left touchpad 53 under a condition that the first manipulation finger stays on the right touchpad 52, a display window of an activated application software is switched to a different display window of the activated application software corresponding to a moving direction of the second manipulation finger on the left touchpad 53. In this case, suppose that the activated application software has two or more display windows For example, when the second manipulation finger moves in the right direction on the left touchpad 53 under a condition that the first manipulation finger stays on the right touchpad 52, the two or more display windows of the activated application software may turn from the left to the right like turning pages of a book, which is bound on the right side.

(13) Display Other Application Software 2

As shown in FIG. 7, when the left touchpad 53 and the right touchpad 52 are pressed approximately at the same time by the second manipulation finger and the first manipulation finger, respectively, the setting window of the activated application software is displayed on the display screen. Further, a display window of a different application software may be displayed other than the setting window of the activated application software.

Figure 8A:
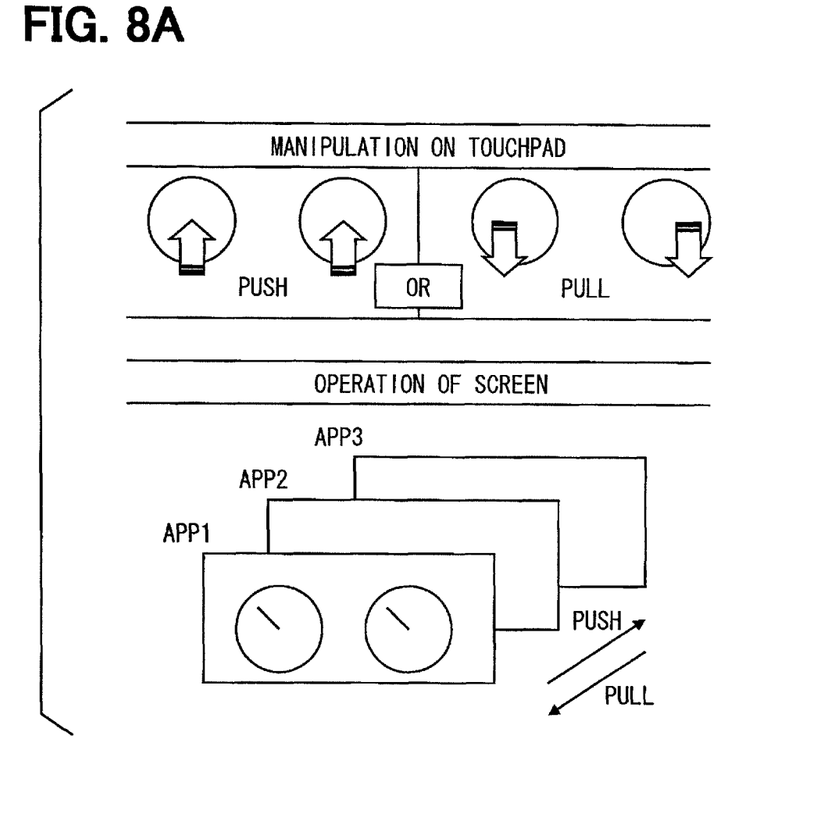
FIG. 8A and FIG. 8B are diagrams showing an example of a double pad manipulation and a corresponding operation of a display device.

The following will describe a case in which the display window of a different application software is displayed other than the setting window of the activated application software. For example, FIG. 8A shows a case in which three application softwares are switchable. The three application softwares include a first application software APP1, a second application software APP2, and a third application software APP3. Suppose that a display window of the first application software APP1 is currently displayed on the display screen. When the front surfaces of the left touchpad 53 and the right touchpad 52 are pressed approximately at the same time by the second manipulation finger and the first manipulation finger, respectively, a display window of the second application software APP2 is displayed on the display screen. Further, when the front surfaces of the left touchpad 53 and the right touchpad 52 are pressed approximately at the same time by the second manipulation finger and the first manipulation finger, respectively, under a condition that the display window of the second application software APP2 is displayed on the display screen, a display window of the third application software APP3 is displayed on the display screen. Further, when the rear surfaces of the left touchpad 53 and the right touchpad 52 are pressed approximately at the same time by the second manipulation finger and the first manipulation finger, respectively, under a condition that the display window of the second application software APP2 is displayed on the display screen, the display window of the first application software APP1 is displayed on the display screen. That is, when pressing the front surfaces of the touchpads 52, 53 at the same time or pressing the rear surfaces of the touchpads 52, 53 at the same time, the display window of the activated application software is switched to the display window of a different application software. Further, by subsequently pressing the front surfaces of the touchpads 52, 53 at the same time or subsequently pressing the rear surfaces of the touchpads 52, 53 at the same time, display windows of plural application softwares switch in a predetermined order or in a reverse order of the predetermined order.

Figure 8B:
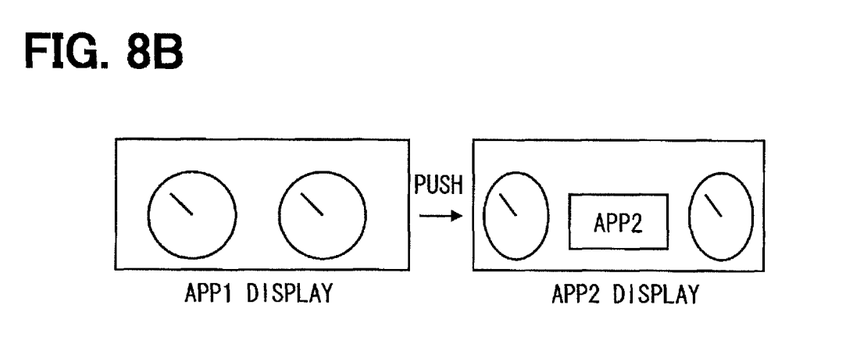

For example, as shown in FIG. 8B, suppose that the first application software APP1, for example, including a speedometer and an engine tachometer (engine revolution counter) is displayed on the display screen. In this case, when the front surface of the left touchpad 53 is pressed by the second manipulation finger and the front surface of the right touchpad 52 is pressed by the first manipulation finger at the same time, the speedometer and the engine tachometer of the first application software. APP1 move to side ends of the display screen and a display window of a second application software APP2 is displayed at a center area of the display screen. In this case, the speedometer and the engine tachometer are displayed together with the display window of the second application software APP2. Further, the display window of the speedometer and the engine tachometer may switch to the display window of the different application software. In this case, the speedometer and the engine tachometer disappear from the display screen.

(14) Display Time-Series Windows

Figure 9:
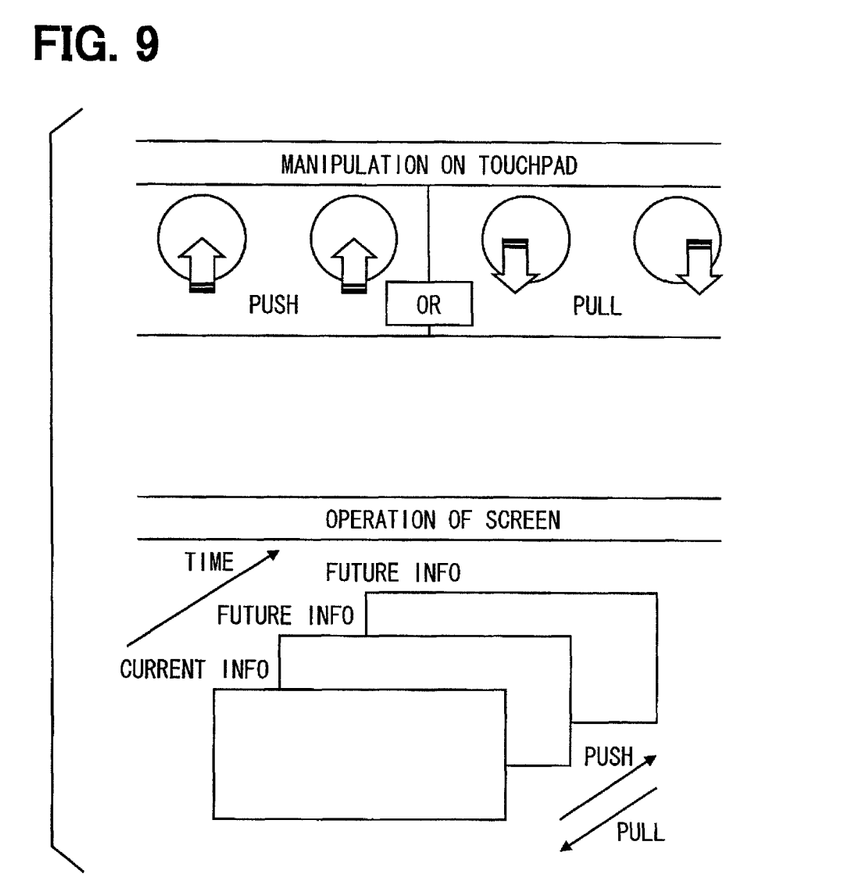
FIG. 9 is a diagram showing an example of a double pad manipulation and a corresponding operation of a display device.

The following will describe a case in which plural time-series windows are displayed on the display screen with reference to FIG. 9. For example, when a display window showing current traffic congestion information has a series display window showing estimated traffic congestion information one hour later and a series display window showing estimated traffic congestion information two hours later, the display windows showing the current traffic congestion information and the estimated traffic congestion information as the following. As shown in FIG. 9, when the front surface of the left touchpad 53 is pressed by the second manipulation finger and the front surface of the right touchpad 52 is pressed by the first manipulation finger approximately at the same time under a condition that the display window shows the current traffic congestion information is displayed on the display screen, the display window showing the current traffic congestion information may switch to the display window showing the estimated traffic congestion information one hour later. Further, when the front surface of the left touchpad 53 is pressed by the second manipulation finger and the front surface of the right touchpad 52 is pressed by the first manipulation finger approximately at the same time under a condition that the display window shows the estimated traffic congestion information one hour later is displayed on the display screen, the display window showing the estimated traffic congestion information one hour later may switch to the display window showing the estimated traffic congestion information two hours later. Further, when the rear surface of the left touchpad 53 is pressed by the second manipulation finger and the rear surface of the right touchpad 52 is pressed by the first manipulation finger approximately at the same time under a condition that the display window shows the current traffic congestion information is displayed on the display screen, the display window showing the current traffic congestion information may switch to a display window showing past traffic congestion information prior to a predetermined period. That is, when the front surfaces of the touchpads 52, 53 are pressed approximately at the same time, the display window showing the current information is switched to the display window showing future information. Further, when the rear surfaces of the touchpads 52, 53 are pressed approximately at the same time, the display window showing the current information is switched to the display window showing past information.

The following will describe advantages provided by the control apparatus according to the present embodiment.

In the present embodiment, the information process ECU 11 executes a function corresponding to a predetermined manipulation on both touchpads 52, 53. With this configuration, an unintentional execution of a specific function is restricted by assigning the specific function to the predetermined manipulation on both touchpads 52, 53. As described above, the specific function refers to a function that may substantially affect the driving of vehicle.

For example, when positions of the first manipulation finger and the second manipulation finger on the right touchpad 52 and the left touchpad 53 change in the same direction, the setting window of the activated application software or the display window of the different application software is displayed on the display screen.

Further, when the first manipulation finger and the second manipulation finger move on the right touchpad 52 and the left touchpad 53 as if a virtual screen is extended outward in the horizontal direction by the manipulation, a scale of the display window displayed on the display screen is decreased. When the first manipulation finger and the second manipulation finger move on the right touchpad 52 and the left touchpad 53 as if a virtual screen is reduced inward in the horizontal direction by the manipulation, a scale of the display window displayed on the display screen is increased.

Further, when the first manipulation finger and the second manipulation finger move on the right touchpad 52 and the left touchpad 53 as if a virtual screen is rotated by the manipulation, the display window displayed on the display screen may be rotated on the vertical plane to which the driver faces.

Since the manipulation on the touchpads 52, 53 corresponds to the operation of the display window displayed on the display screen, the driver can intuitively manipulate the touchpads 52, 53 to operate the display window displayed on the display screen.

Other Embodiments

The following will describe other embodiments of the present disclosure.

In the foregoing embodiment, the current display window is displayed on an entire region of the display screen. Further, the current display window may be displayed on a part of the entire region of the display screen.

With respect to one function, the manipulation on the touchpads 52, 53 in a case where the vehicle is in a stop state may be set differently from the manipulation on the touchpads 52, 53 in a case where the vehicle is in a running state. For example, in the running state, when the positions of the first manipulation finger and the second manipulation finger on touchpads 52, 53 change in the same direction, the setting window of the activated application software or the display window of the different application software is displayed on the display screen. Further, in the stop state, when the position of one of the first manipulation finger and the second manipulation finger on the corresponding touchpad 52, 53 change, the setting window of the different application software is displayed on the display screen. With this configuration, an unintentional execution of the specific function is restricted during the running state and the specific function is executed by a simple manipulation during the stop state. Further, the CPU of the manipulation signal processing unit 12 may determine whether the vehicle is in the running state or in the stop state based on information transmitted from a sensor detecting a position of the gear stick and a sensor detecting a position of a parking brake.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A control apparatus comprising:
   a first input unit that receives a first manipulation signal from a first touchpad, the first manipulation signal being indicative of a first manipulation performed on the first touchpad;
   a second input unit that receives a second manipulation signal from a second touchpad, the second manipulation signal being indicative of a second manipulation performed on the second touchpad;
   an operation command output unit that
      determines whether a double pad manipulation supporting mode occurs in which both the first input unit and the second input unit are receiving the first manipulation signal and the second manipulation signal, respectively, at a same time, and
      outputs an operation command to a display device based on a combination of the first manipulation performed on the first touchpad and the second manipulation performed on the second touchpad, when the operation command output unit determines that the double pad manipulation supporting mode occurs;
   a cancellation unit that cancels an output of the operation command from the operation command output unit and cancels the double pad manipulation supporting mode, when the cancellation unit determines that (i) the first input unit fails to receive the first manipulation signal for a predetermined time period in the double pad manipulation supporting mode, or (ii) the second input unit fails to receive the second manipulation signal for the predetermined time period in the double pad manipulation supporting mode,
      wherein the first touchpad is arranged at a first position that is approachable by a user with a first manipulation finger of a left hand,
      wherein the first touchpad detects the first manipulation including a first manipulation point and a first manipulation pressure on a surface of the first touchpad,
      wherein the second touchpad is arranged at a second position that is approachable by the user with a second manipulation finger of a right hand, and
      wherein the second touchpad detects the second manipulation including a second manipulation point and a second manipulation pressure on a surface of the second touchpad; and
   a switching unit that switches an operation mode of the control apparatus from a single pad manipulation supporting mode to the double pad manipulation supporting mode when both the first touchpad and the second touch pad are simultaneously touched by the user, wherein
   the switching unit
      controls the display device to display a guide image indicating a double pad manipulation executable on the first touchpad and the second touch pad after the switching unit switches from the single pad manipulation supporting mode to the double pad manipulation supporting mode, and
      controls the display device to cancel display of the guide image indicating the double pad manipulation in response to canceling the double pad manipulation supporting mode.

2. The control apparatus according to claim 1,
   wherein, when the first manipulation point on the first touchpad and the second manipulation point on the second touchpad change in the same manner or in a correlative manner, the operation command output unit outputs the operation command corresponding to the combination of the first manipulation and the second manipulation.

3. The control apparatus according to claim 1,
   wherein, when the first manipulation point on the first touchpad and the second manipulation point on the second touchpad synchronously change in the same manner or in a correlative manner, the operation command output unit outputs the operation command corresponding to the combination of the first manipulation and the second manipulation.

4. The control apparatus according to claim 3,
   wherein, when the first manipulation point on the first touchpad and the second manipulation point on the second touchpad move in the same direction, the operation command output unit outputs a switch command as the operation command to switch a current display window that is currently displayed on a display screen of the display device to a different display window.

5. The display control apparatus according to claim 4, wherein the current display window is displayed on an entire region of the display screen.

6. The display control apparatus according to claim 4, wherein the current display window is displayed on a part of an entire region of the display screen.

7. The control apparatus according to claim 3, wherein, when a displacement of the first manipulation point on the first touchpad is in a left direction and a displacement of the second manipulation point on the second touchpad is in a right direction, the operation command output unit outputs a zoom in command as the operation command to zoom in a current display window that is currently displayed on a display screen of the display device, and wherein, when the displacement of the first manipulation point on the first touchpad is in the right direction and the displacement of the second manipulation point on the second touchpad is in the left direction, the operation command output unit outputs a zoom out command as the operation command to zoom out the current display window.

8. The control apparatus according to claim 3, wherein the first touchpad and the second touchpad are arranged so that the surface of the first touchpad and the surface of the second touchpad are approximately parallel to a vertical plane to which the user faces, wherein, when a displacement of the first manipulation point on the first touchpad is in an upward direction and a displacement of the second manipulation point on the second touchpad is in a downward direction, the operation command output unit outputs a first rotation command as the operation command to rotate a current display window that is currently displayed on a display screen of the display device in a clockwise direction, and wherein, when the displacement of the first manipulation point on the first touchpad is in the downward direction and the displacement of the second manipulation point on the second touchpad is in the upward direction, the operation command output unit outputs a second rotation command as the operation command to rotate the current display window in a counterclockwise direction.

9. The control apparatus according to claim 1, wherein, when the first manipulation finger is in contact with the first touchpad, the operation command output unit outputs the operation command based on the second manipulation performed on the second touchpad, and wherein, when the second manipulation finger is in contact with the second touchpad, the operation command output unit outputs the operation command based on the first manipulation performed on the first touchpad.

10. The control apparatus according to claim 1, wherein the surface of the first touchpad is referred to as a first front surface, and the surface of the second touchpad is referred to as a second front surface, wherein the first touchpad further includes a first rear surface, and the second touchpad further includes a second rear surface, wherein the first front surface is arranged to face the user, and the first rear surface is arranged on an opposite side of the first front surface from the user, wherein the second front surface is arranged to face the user, and the second rear surface is arranged on an opposite side of the second front surface from the user, wherein the first touchpad further detects the first manipulation including the first manipulation point and the first manipulation pressure on the first rear surface, and the second touchpad further detects the second manipulation including the second manipulation point and the second manipulation pressure on the second rear surface, wherein, when the first rear surface of the first touchpad is pressed by the first manipulation finger and the second front surface of the second touchpad is pressed by the second manipulation finger, the operation command output unit outputs the operation command to execute a predetermined function, and wherein, when the first front surface of the first touchpad is pressed by the first manipulation finger and the second rear surface of the second touchpad is pressed by the second manipulation finger, the operation command output unit outputs the operation command to execute the predetermined function.

11. The control apparatus according to claim 10, wherein a display window that is currently displayed on a display screen of the display device is referred to as a current display window, wherein the predetermined function refers to a function that displays a different display window by rotating the current display window around a rotation axis in a three-dimensional manner, and wherein the rotation axis is positioned at a center of the current display window and extends in an up-down direction of the current display window.

12. The control apparatus according to claim 1, further comprising a guide-display command output unit that outputs a guide-display command to the display device to display a manipulation guide window on a display screen of the display device when both the first touchpad and the second touchpad are manipulated by the first manipulation finger and the second manipulation finger, respectively.

13. A program product stored in a non-transitory computer-readable medium for processing signals output from a first touchpad and a second touchpad, the program product comprising instructions for:

inputting a first manipulation signal, which is transmitted from the first touchpad and is indicative of a first manipulation performed on the first touchpad;

inputting a second manipulation signal, which is transmitted from the second touchpad and is indicative of a second manipulation performed on the second touchpad;

determining whether a double pad manipulation supporting mode occurs, in which both the first manipulation signal from the first touchpad and the second manipulation signal from the second touchpad are being input at a same time;

outputting an operation command to a display device based on a combination of the first manipulation performed on the first touchpad and the second manipulation performed on the second touchpad, when it is determined that a double pad manipulation supporting mode occurs;

canceling the outputting of the operation command and canceling the double pad manipulation supporting mode, when failing to receive the first manipulation signal or the second manipulation signal for a predetermined time period in the double pad manipulation supporting mode, wherein the first touchpad is arranged at a first position that is approachable by a user with a first manipulation finger of a left hand, wherein the first touchpad detects the first manipulation including a first manipulation point and a first manipulation pressure on a surface of the first touchpad, wherein the second touchpad is arranged at a second position that is approachable by the user with a second manipulation finger of a right hand, and wherein the second touchpad detects the second manipulation including a second manipulation point and a second manipulation pressure on a surface of the second touchpad; and switching an operation mode of the control apparatus from a single pad manipulation supporting mode to the double pad manipulation supporting mode when both the first touchpad and the second touch pad are simultaneously touched by the user, wherein the switching
- controls the display device to display a guide image indicating a double pad manipulation executable on the first touchpad and the second touchpad after the switching unit switches from the single pad manipulation supporting mode to the double pad manipulation supporting mode, and
- controls the display device to cancel display of the guide image indicating the double pad manipulation in response to canceling the double pad manipulation supporting mode.

14. The control apparatus according to claim 1, wherein
the control apparatus, the first touchpad, the second touchpad, and the display device are equipped to a vehicle, the double pad manipulation mode is correlated to a specific vehicle related function that substantially affects a driving of the vehicle, and
the single pad manipulation mode is correlated to a normal vehicle related function that does not substantially affect the driving of the vehicle compared with the specific vehicle related function.

15. The control apparatus according to claim 14, wherein
the specific vehicle related function includes at least one of a route guidance, a map display, an application switch, a movement of a screen image, a display window switch, or a turning on and turning off of an audio device, and
the normal vehicle related function includes at least one of a temperature change or an audio volume change.

16. The control apparatus according to claim 1, wherein
the guide image that is displayed on the display device to indicate a double pad manipulation includes a first sub-image that displays a first manipulation guide related to the first touchpad and a second sub-image that displays a second manipulation guide related to the second touchpad, the first manipulation guide and the second manipulation guide being spaced apart from each other.

17. The control apparatus according to claim 16, wherein
the guide image that indicates a double pad manipulation is overlapped over a display image on the display screen displayed from the single pad manipulation supporting mode, the first sub-image and the second sub-image being separated from each other by a central portion of the display image.

* * * * *